United States Patent
Yun et al.

(10) Patent No.: US 9,712,370 B2
(45) Date of Patent: Jul. 18, 2017

(54) ZERO-INTERMEDIATE FREQUENCY CORRECTION METHOD, APPARATUS, AND DEVICE

(71) Applicant: Huawei Technologies Co., Ltd., Shenzhen (CN)

(72) Inventors: Guofei Yun, Shenzhen (CN); Hunter Wang, Xi'an (CN); Jianxiong Bai, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/199,655

(22) Filed: Jun. 30, 2016

(65) Prior Publication Data

US 2016/0315798 A1 Oct. 27, 2016

Related U.S. Application Data

(63) Continuation of application No. PCT/CN2013/091077, filed on Dec. 31, 2013.

(51) Int. Cl.
*H04L 27/38* (2006.01)
*H04B 1/30* (2006.01)
*H04L 27/00* (2006.01)
*H04B 1/00* (2006.01)

(52) U.S. Cl.
CPC ....... *H04L 27/3863* (2013.01); *H04B 1/0007* (2013.01); *H04B 1/30* (2013.01); *H04L 27/0014* (2013.01); *H04L 2027/0024* (2013.01)

(58) Field of Classification Search
CPC ............ H04L 27/3863; H04L 27/0014; H04L 2027/0024; H04B 1/0007; H04B 1/30
See application file for complete search history.

(56) References Cited

U.S. PATENT DOCUMENTS

| 2004/0121738 | A1 | 6/2004 | Ide | |
|---|---|---|---|---|
| 2007/0098114 | A1* | 5/2007 | Hundhausen | H03J 7/02 375/326 |
| 2007/0127611 | A1* | 6/2007 | Chong | H04B 1/30 375/355 |
| 2009/0325516 | A1 | 12/2009 | Safavi | |
| 2010/0329394 | A1 | 12/2010 | Bae et al. | |
| 2011/0058595 | A1* | 3/2011 | Skeet | H04L 27/38 375/232 |
| 2012/0106678 | A1* | 5/2012 | Currivan | H04L 27/0014 375/320 |

(Continued)

FOREIGN PATENT DOCUMENTS

| CN | 1392691 A | 1/2003 |
|---|---|---|
| CN | 101257465 A | 9/2008 |
| CN | 101540626 A | 9/2009 |

(Continued)

*Primary Examiner* — Kenneth Lam
(74) *Attorney, Agent, or Firm* — Slater Matsil, LLP

(57) ABSTRACT

A signal receiving apparatus receives a radio frequency signal sent by a signal transmitting apparatus, where the radio frequency signal includes a transmit end image component. The signal receiving apparatus generates a receive end image component after performing down-conversion processing on the radio frequency signal. The signal receiving apparatus separately removes the receive end image component and the transmit end image component by performing quadrature modulation compensation twice.

20 Claims, 10 Drawing Sheets

(56) References Cited

U.S. PATENT DOCUMENTS

2012/0115412 A1   5/2012   Gainey et al.

FOREIGN PATENT DOCUMENTS

| CN | 101610090 A | 12/2009 |
| CN | 101616125 A | 12/2009 |
| CN | 102594381 A | 7/2012 |
| CN | 102833198 A | 12/2012 |
| CN | 102882818 A | 1/2013 |
| EP | 1791310 A1 | 5/2007 |
| JP | 2013090003 A | 5/2013 |

\* cited by examiner

ZERO-INTERMEDIATE FREQUENCY CORRECTION METHOD, APPARATUS, AND DEVICE

CROSS-REFERENCE TO RELATED APPLICATIONS

This application is a continuation of International Application No. PCT/CN2013/091077, filed on Dec. 31, 2013, which is hereby incorporated by reference in its entirety.

TECHNICAL FIELD

The present invention relates to the field of communications technologies, and in particular embodiments, to a zero intermediate frequency correction method, apparatus, and device.

BACKGROUND

A conventional modulation and demodulation manner is as follows: After an antenna acquires a radio frequency (RF) signal, the radio frequency signal is first converted into an intermediate frequency signal, and then the intermediate frequency signal is converted into a baseband signal, where the baseband signal may be an in-phase/quadrature (I/Q) signal. A zero intermediate frequency technology is a modulation and demodulation method for directly converting an RF signal into a baseband signal without using an intermediate frequency signal.

In recent years, as devices develop, the zero intermediate frequency technology is widely applied, and gradually becomes mature. A working principle of a transceiver in a zero intermediate frequency architecture is as follows. A baseband signal is input to a quadrature modulator through I and Q channels, and the quadrature modulator performs quadrature modulation on an I signal and a Q signal. Additionally, the transceiver transmits signals output by the quadrature modulator.

Because an actual quadrature modulator generally cannot implement complete quadrature for two signals, a quadrature modulation error is caused. Such an undesired problem of the quadrature modulator may cause carrier leakage and imbalance between the I signal and the Q signal. The imbalance between the I signal and the Q signal may cause an image component, and the image component may cause a decrease in signal quality. Therefore, a transceiver that uses the zero intermediate frequency technology needs to perform correction processing.

A current correction method is as follows: adding a corresponding feedback module or coupling module between a transmit end and a receive end of a transceiver; calculating a corresponding compensation coefficient by comparing a feedback signal and a baseband signal; and performing corresponding compensation. Adding of the feedback module or coupling module increases hardware costs of the transceiver, and increases complexity of hardware design.

SUMMARY

Embodiments of the present invention provide a signal receiving apparatus, and image components caused by imbalance between two signals in a baseband signal can be removed without a need of designing a feedback module or a coupling module, thereby improving signal quality and reducing complexity of hardware design. The embodiments of the present invention further provide a signal receiving and transmitting device and a signal correction method.

A first aspect provides a signal receiving apparatus, including a receiving unit, configured to receive a radio frequency signal sent by a signal transmitting apparatus, where the radio frequency signal is obtained after the signal transmitting apparatus processes a transmit end baseband signal, the radio frequency signal includes a transmit end image component, and the transmit end image component is generated before the signal transmitting apparatus performs up-conversion processing on an analog signal generated after the signal transmitting apparatus performs digital-to-analog conversion on the transmit end baseband signal, and is an interference signal that is conjugate with the analog signal. The signal receiving apparatus also includes an analog-to-digital conversion unit, configured to convert the radio frequency signal received by the receiving unit into a first digital signal. The signal receiving apparatus further includes a symbol synchronization processing unit, configured to perform symbol synchronization processing on the first digital signal obtained after the analog-to-digital conversion unit performs conversion, to obtain a second digital signal, where a rate at which the second digital signal runs in the signal receiving apparatus keeps consistent with a rate at which the transmit end baseband signal runs in the signal transmitting apparatus, the second digital signal includes a receive end image component, and the receive end image component is generated after the signal receiving apparatus performs down-conversion processing on the received radio frequency signal, and is an interference signal that is conjugate with a low frequency signal generated after down-conversion processing is performed on the radio frequency signal. The signal receiving apparatus also includes a first quadrature modulation compensation unit, configured to remove the receive end image component from the second digital signal obtained after the symbol synchronization processing unit performs symbol synchronization processing, to obtain a quadrature modulation compensated signal. The signal receiving apparatus also includes a frequency offset correction unit, configured to perform frequency adjustment on the quadrature modulation compensated signal obtained after the first quadrature modulation compensation unit performs processing, so that a frequency of a frequency offset corrected signal obtained after adjustment is the same as a frequency of the transmit end baseband signal. The signal receiving apparatus further includes a second quadrature modulation compensation unit, configured to remove the transmit end image component from the frequency offset corrected signal obtained after the frequency offset correction unit performs adjustment, to obtain a receive end baseband signal.

In an implementation of the first aspect, the signal receiving apparatus further includes a balance processing unit, configured to adjust a modulus value of the first digital signal obtained after the analog-to-digital conversion unit performs conversion, the second digital signal obtained after the symbol synchronization processing unit performs symbol synchronization processing, the quadrature modulation compensated signal obtained after the first quadrature modulation compensation unit performs processing, the frequency offset corrected signal obtained after the frequency offset correction unit performs processing, or the receive end baseband signal obtained after the second quadrature modulation compensation unit performs processing, so that a modulus value of the first digital signal, the second digital signal, the quadrature modulation compensated signal, the frequency offset corrected signal, or the receive end baseband signal whose modulus value is adjusted keeps consistent with a modulus value of the transmit end baseband signal.

In an implementation of the first aspect, the signal receiving apparatus further includes a phase noise immunity processing unit, configured to perform phase adjustment on the receive end baseband signal obtained after the second quadrature modulation compensation unit performs processing, so that the receive end baseband signal whose phase is adjusted keeps consistent with a phase of the transmit end baseband signal.

In an implementation of the first aspect, the first quadrature modulation compensation unit includes the following. A direct-current removing subunit, configured to perform direct-current component removing processing on the second digital signal obtained after the symbol synchronization processing unit performs symbol synchronization processing, to obtain a distorted signal before correction. A first calculation subunit, configured to obtain a receive end correction coefficient by calculation according to the distorted signal before correction that is obtained after the direct-current removing subunit performs direct-current removing, where the receive end correction coefficient is a ratio of an autocorrelation value of the distorted signal before correction to a cross-correlation value of the distorted signal before correction and an image of the distorted signal before correction. A second calculation subunit, configured to obtain the quadrature modulation compensated signal by calculation according to the distorted signal before correction, the image of the distorted signal before correction, and the receive end correction coefficient obtained by calculation by the first calculation subunit, where the quadrature modulation compensated signal is a difference between the distorted signal before correction and the receive end image component, and the receive end image component is a product of the receive end correction coefficient and the image of the distorted signal before correction.

In an implementation of the first aspect, the direct-current removing subunit is configured to perform the following: Collect statistics about a direct-current amount of N signal points of the second digital signal obtained after the symbol synchronization processing unit performs processing, where a value of N is corresponding to a preset length of direct-current statistics collection signal points; divide the direct-current amount of the N signal points by the preset length of the direct-current statistics collection signal points to obtain a direct-current component; and subtract the direct-current component from each signal point to obtain the distorted signal before correction.

In an implementation of the first aspect, the second quadrature modulation compensation unit includes: a third calculation subunit, configured to obtain an optimal transmit end correction coefficient by calculation according to an adaptive iteration algorithm; and a fourth calculation subunit, configured to obtain the receive end baseband signal by calculation according to the frequency offset corrected signal obtained after the frequency offset correction unit performs processing, an image of the frequency offset corrected signal, and the optimal transmit end correction coefficient obtained by calculation by the third calculation subunit. The receive end baseband signal is a difference between the frequency offset corrected signal and the receive end image component, and the receive end image component is a product of the optimal transmit end correction coefficient and the image of the frequency offset corrected signal.

In an implementation of the first aspect, the third calculation subunit is configured to: obtain a compensation coefficient increment by using a hard decision process, where the compensation coefficient increment is a product of a quantized value of an input signal in hard decision, an iteration step, and a difference that is obtained by calculation, the difference that is obtained by calculation is a difference between a quantized value of an output signal in hard decision and the quantized value of the input signal in hard decision, the input signal has already been aligned with the output signal before the difference is obtained, the iteration step is used to adjust a transmit end correction coefficient, and a compensation coefficient increment obtained at the first time is the first transmit end correction coefficient; and update the transmit end correction coefficient by accumulating the compensation coefficient increment, until the optimal transmit end correction coefficient is obtained.

A second aspect provides a signal receiving and transmitting device, including a signal receiving apparatus and a signal transmitting apparatus, where a signal transmitting apparatus in a signal receiving and transmitting device is communicatively connected to a signal receiving apparatus in another signal receiving and transmitting device. The signal transmitting apparatus is configured to: generate a transmit end baseband signal, and after processing the transmit end baseband signal into a radio frequency signal, transmit the radio frequency signal, where the transmit end baseband signal becomes an analog signal after the signal transmitting apparatus performs digital-to-analog conversion, and the analog signal becomes the radio frequency signal after the signal transmitting apparatus performs up-conversion processing; and generate a transmit end image component before up-conversion processing. The signal receiving apparatus is the signal receiving apparatus described in the foregoing technical solution.

A third aspect provides a signal receiving and transmitting device, including: a receiver, a transmitter, a memory, and a processor; where the receiver is configured to receive a radio frequency signal transmitted by another signal receiving and transmitting device; the transmitter is configured to transmit a radio frequency signal to another signal receiving and transmitting device; and the memory is configured to store a program for zero intermediate frequency signal correction executed by the processor. The processor is configured to execute the following steps. Converting the radio frequency signal received by the receiver from the another signal receiving and transmitting device into a first digital signal. Performing symbol synchronization processing on the first digital signal obtained after analog-to-digital conversion, to obtain a second digital signal, where a rate at which the second digital signal runs in the signal receiving apparatus keeps consistent with a rate at which the transmit end baseband signal runs in the signal transmitting apparatus, the second digital signal includes a receive end image component, and the receive end image component is generated after the signal receiving apparatus performs down-conversion processing on the received radio frequency signal, and is an interference signal that is conjugate with a low frequency signal generated after down-conversion processing is performed on the radio frequency signal. Removing the receive end image component from the second digital signal obtained after symbol synchronization processing, to obtain a quadrature modulation compensated signal. Performing frequency adjustment on the quadrature modulation compensated signal, so that a frequency of a frequency offset corrected signal obtained after adjustment is the same as a frequency of the transmit end baseband signal. Removing the transmit end image component from the frequency offset corrected signal obtained after frequency offset adjustment, to obtain a receive end baseband signal.

In an implementation of the third aspect, the processor is further configured to adjust a modulus value of the first digital signal obtained after analog-to-digital conversion, the second digital signal obtained after symbol synchronization processing, the quadrature modulation compensated signal, the frequency offset corrected signal, or the receive end baseband signal, so that a modulus value of the first digital signal, the second digital signal, the quadrature modulation compensated signal, the frequency offset corrected signal, or the receive end baseband signal whose modulus value is adjusted keeps consistent with a modulus value of the transmit end baseband signal.

In an implementation of the third aspect, the processor is further configured to perform phase adjustment on the receive end baseband signal, so that the receive end baseband signal whose phase is adjusted keeps consistent with a phase of the transmit end baseband signal.

In an implementation of the third aspect, the processor is configured to: perform direct-current component removing processing on the second digital signal obtained after symbol synchronization processing, to obtain a distorted signal before correction. The processor is also configured to obtain a receive end correction coefficient by calculation according to the distorted signal before correction that is obtained after direct-current removing, where the receive end correction coefficient is a ratio of an autocorrelation value of the distorted signal before correction to a cross-correlation value of the distorted signal before correction and an image of the distorted signal before correction. The processor is also configured to obtain the quadrature modulation compensated signal by calculation according to the distorted signal before correction, the image of the distorted signal before correction, the receive end correction coefficient, and the image of the distorted signal before correction, where the quadrature modulation compensated signal is a difference between the distorted signal before correction and the receive end image component, and the receive end image component is a product of the receive end correction coefficient and the image of the distorted signal before correction.

In an implementation of the third aspect, the processor is configured to: collect statistics about a direct-current amount of N signal points of the second digital signal obtained after symbol synchronization processing, where a value of N is corresponding to a preset length of direct-current statistics collection signal points. The processor is also configured to divide the direct-current amount of the N signal points by the preset length of the direct-current statistics collection signal points to obtain a direct-current component. The processor is also configured to subtract the direct-current component from each signal point to obtain the distorted signal before correction.

In an implementation of the third aspect, the processor is configured to: obtain an optimal transmit end correction coefficient by calculation according to an adaptive iteration algorithm; and obtain the receive end baseband signal by calculation according to the frequency offset corrected signal, an image of the frequency offset corrected signal, and the optimal transmit end correction coefficient, where the receive end baseband signal is a difference between the frequency offset corrected signal and the receive end image component, and where the receive end image component is a product of the optimal transmit end correction coefficient and the image of the frequency offset corrected signal.

In an implementation of the third aspect, the processor is configured to: obtain a compensation coefficient increment by using a hard decision process, where the compensation coefficient increment is a product of a quantized value of an input signal in hard decision, an iteration step, and a difference that is obtained by calculation, the difference that is obtained by calculation is a difference between a quantized value of an output signal in hard decision and the quantized value of the input signal in hard decision, the input signal has already been aligned with the output signal before the difference is obtained, the iteration step is used to adjust a transmit end correction coefficient, and a compensation coefficient increment obtained at the first time is the first transmit end correction coefficient. The processor is also configured to update the transmit end correction coefficient by accumulating the compensation coefficient increment, until the optimal transmit end correction coefficient is obtained.

A fourth aspect provides a zero intermediate frequency signal correction method, including the following. Receiving, by a signal receiving apparatus, a radio frequency signal sent by a signal transmitting apparatus, where the radio frequency signal is obtained after the signal transmitting apparatus processes a transmit end baseband signal, the radio frequency signal includes a transmit end image component, and the transmit end image component is generated before the signal transmitting apparatus performs up-conversion processing on an analog signal generated after the signal transmitting apparatus performs digital-to-analog conversion on the transmit end baseband signal, and is an interference signal that is conjugate with the analog signal. Converting the radio frequency signal into a first digital signal. Performing symbol synchronization processing on the first digital signal obtained after analog-to-digital conversion, to obtain a second digital signal, where a rate at which the second digital signal runs in the signal receiving apparatus keeps consistent with a rate at which the transmit end baseband signal runs in the signal transmitting apparatus, the second digital signal includes a receive end image component, and the receive end image component is generated after the signal receiving apparatus performs down-conversion processing on the received radio frequency signal, and is an interference signal that is conjugate with a low frequency signal generated after down-conversion processing is performed on the radio frequency signal. Removing the receive end image component from the second digital signal obtained after symbol synchronization processing, to obtain a quadrature modulation compensated signal. Performing frequency adjustment on the quadrature modulation compensated signal, so that a frequency of a frequency offset corrected signal obtained after adjustment is the same as a frequency of the transmit end baseband signal. Removing the transmit end image component from the frequency offset corrected signal obtained after adjustment, to obtain a receive end baseband signal.

In an implementation of the fourth aspect, the method further includes: adjusting a modulus value of the first digital signal obtained after analog-to-digital conversion, the second digital signal obtained after symbol synchronization processing, the quadrature modulation compensated signal, the frequency offset corrected signal, or the receive end baseband signal, so that a modulus value of the first digital signal, the second digital signal, the quadrature modulation compensated signal, the frequency offset corrected signal, or the receive end baseband signal whose modulus value is adjusted keeps consistent with a modulus value of the transmit end baseband signal.

In an implementation of the fourth aspect, after the removing the transmit end image component from the frequency offset corrected signal obtained after adjustment, to obtain a receive end baseband signal, the method further includes: performing phase adjustment on the receive end baseband signal, so that the receive end baseband signal whose phase is adjusted keeps consistent with a phase of the transmit end baseband signal.

In an implementation of the fourth aspect, the removing the receive end image component from the second digital signal obtained after symbol synchronization processing, to obtain a quadrature modulation compensated signal includes the following. Performing direct-current component removing processing on the second digital signal obtained after symbol synchronization processing, to obtain a distorted signal before correction. Obtaining a receive end correction coefficient by calculation according to the distorted signal before correction that is obtained after direct-current removing, where the receive end correction coefficient is a ratio of an autocorrelation value of the distorted signal before correction to a cross-correlation value of the distorted signal before correction and an image of the distorted signal before correction. Obtaining the quadrature modulation compensated signal by calculation according to the distorted signal before correction, the image of the distorted signal before correction, the receive end correction coefficient, and the image of the distorted signal before correction, where the quadrature modulation compensated signal is a difference between the distorted signal before correction and the receive end image component, and the receive end image component is a product of the receive end correction coefficient and the image of the distorted signal before correction.

In an implementation of the fourth aspect, the performing direct-current component removing processing on the second digital signal obtained after symbol synchronization processing, to obtain a distorted signal before correction includes the following. Collecting statistics about a direct-current amount of N signal points of the second digital signal obtained after symbol synchronization processing, where a value of N is corresponding to a preset length of direct-current statistics collection signal points. Dividing the direct-current amount of the N signal points by the preset length of the direct-current statistics collection signal points to obtain a direct-current component. Subtracting the direct-current component from each signal point to obtain the distorted signal before correction.

In an implementation of the fourth aspect, the performing transmit end image component removing processing on the frequency offset corrected signal, to obtain a receive end baseband signal includes the following. Obtaining an optimal transmit end correction coefficient by calculation according to an adaptive iteration algorithm; and obtaining the receive end baseband signal by calculation according to the frequency offset corrected signal, an image of the frequency offset corrected signal, and the optimal transmit end correction coefficient, where the receive end baseband signal is a difference between the frequency offset corrected signal and the receive end image component, and the receive end image component is a product of the optimal transmit end correction coefficient and the image of the frequency offset corrected signal.

In an implementation of the fourth aspect, the obtaining an optimal transmit end correction coefficient by calculation according to an adaptive iteration algorithm includes the following. Obtaining a compensation coefficient increment by using a hard decision process, where the compensation coefficient increment is a product of a quantized value of an input signal in hard decision, an iteration step, and a difference that is obtained by calculation, the difference that is obtained by calculation is a difference between a quantized value of an output signal in hard decision and the quantized value of the input signal in hard decision, the input signal has already been aligned with the output signal before the difference is obtained, the iteration step is used to adjust a transmit end correction coefficient, and a compensation coefficient increment obtained at the first time is the first transmit end correction coefficient. Updating the transmit end correction coefficient by accumulating the compensation coefficient increment, until the optimal transmit end correction coefficient is obtained.

In the prior art, a feedback module or a coupling module is added to perform signal correction, however, in the embodiments of the present invention, the signal receiving apparatus can remove image components by performing quadrature modulation compensation twice on a radio frequency signal received from a signal transmitting apparatus, thereby improving signal quality and reducing complexity of hardware design.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

FIG. 1o is a schematic diagram of a principle of quadrature modulation compensation at a receive end according to an embodiment of the present invention;

DETAILED DESCRIPTION OF ILLUSTRATIVE EMBODIMENTS

Embodiments of the present invention provide a signal receiving apparatus, and image components caused by imbalance between two signals in a baseband signal can be removed without a need of designing a feedback module and a coupling module, thereby improving signal quality and reducing complexity of hardware design. The embodiments of the present invention further provide a signal receiving and transmitting device and a zero intermediate frequency signal correction method. The following separately provides detailed descriptions.

The following describes the technical solutions in the embodiments of the present invention with reference to the accompanying drawings in the embodiments of the present invention. The described embodiments are merely some but not all of the embodiments of the present invention. All other embodiments obtained by a person skilled in the art based on the embodiments of the present invention without creative efforts shall fall within the protection scope of the present disclosure.

Figure 1:
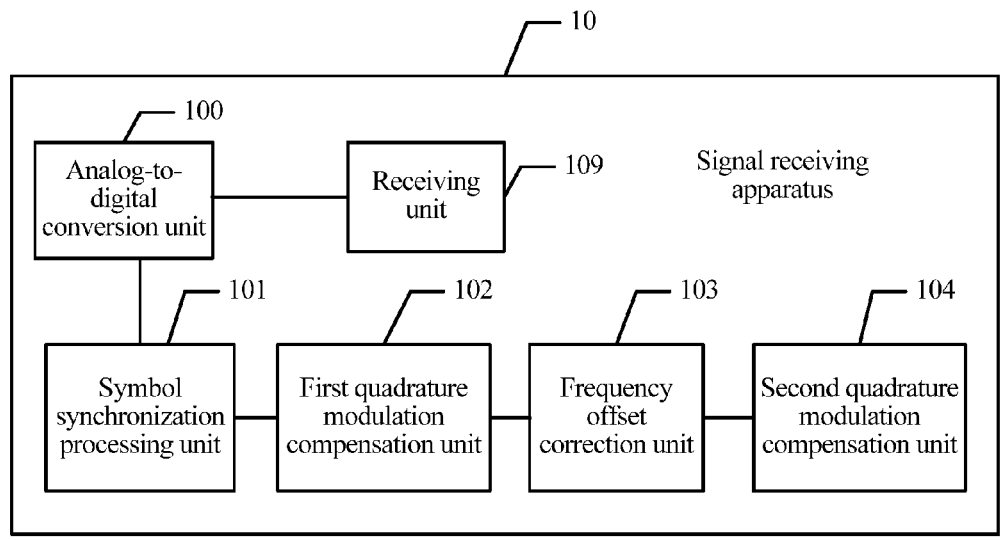
FIG. 1 is a schematic diagram of an embodiment of a signal receiving apparatus according to an embodiment of the present invention.

Referring to FIG. 1, in an embodiment, a signal receiving apparatus 110 includes the following. A receiving unit 109, configured to receive a radio frequency signal sent by a signal transmitting apparatus. The radio frequency signal is obtained after the signal transmitting apparatus processes a transmit end baseband signal. The radio frequency signal includes a transmit end image component. The transmit end image component is generated before the signal transmitting apparatus performs up-conversion processing on an analog signal. The analog signal is generated after the signal transmitting apparatus performs digital-to-analog conversion on the transmit end baseband signal, and is an interference signal that is conjugate with the analog signal. An analog-to-digital conversion unit 100, configured to convert the radio frequency signal received by the receiving unit 109 into a first digital signal, where the signal transmitting apparatus may be a separate signal transmitting apparatus, or may be a signal transceiver or another apparatus or device that transmits a signal. A symbol synchronization processing unit 101, configured to perform symbol synchronization processing on the first digital signal obtained after the analog-to-digital conversion unit 100 performs conversion, to obtain a second digital signal. A rate at which the second digital signal runs in the signal receiving apparatus 110 keeps consistent with a rate at which the transmit end baseband signal runs in the signal transmitting apparatus. The second digital signal includes a receive end image component, and the receive end image component is generated after the signal receiving apparatus performs down-conversion processing on the received radio frequency signal, and is an interference signal that is conjugate with a low frequency signal generated after down-conversion processing is performed on the radio frequency signal. A first quadrature modulation compensation unit 102, configured to remove the receive end image component from the second digital signal obtained after the symbol synchronization processing unit 101 performs symbol synchronization processing, to obtain a quadrature modulation compensated signal. A frequency offset correction unit 103, configured to perform frequency adjustment on the quadrature modulation compensated signal obtained after the first quadrature modulation compensation unit 102 performs processing, so that a frequency of a frequency offset corrected signal obtained after adjustment is the same as a frequency of the transmit end baseband signal. A second quadrature modulation compensation unit 104, configured to remove the transmit end image component from the frequency offset corrected signal obtained after the frequency offset correction unit 103 performs adjustment, to obtain a receive end baseband signal.

Compared with a solution in the prior art that a feedback module and a coupling module are added to perform signal correction, the signal receiving apparatus provided in this embodiment of the present invention can remove image components by performing quadrature modulation compensation twice on a radio frequency signal received from a signal transmitting apparatus, thereby improving signal quality and reducing complexity of hardware design.

Figure 2:
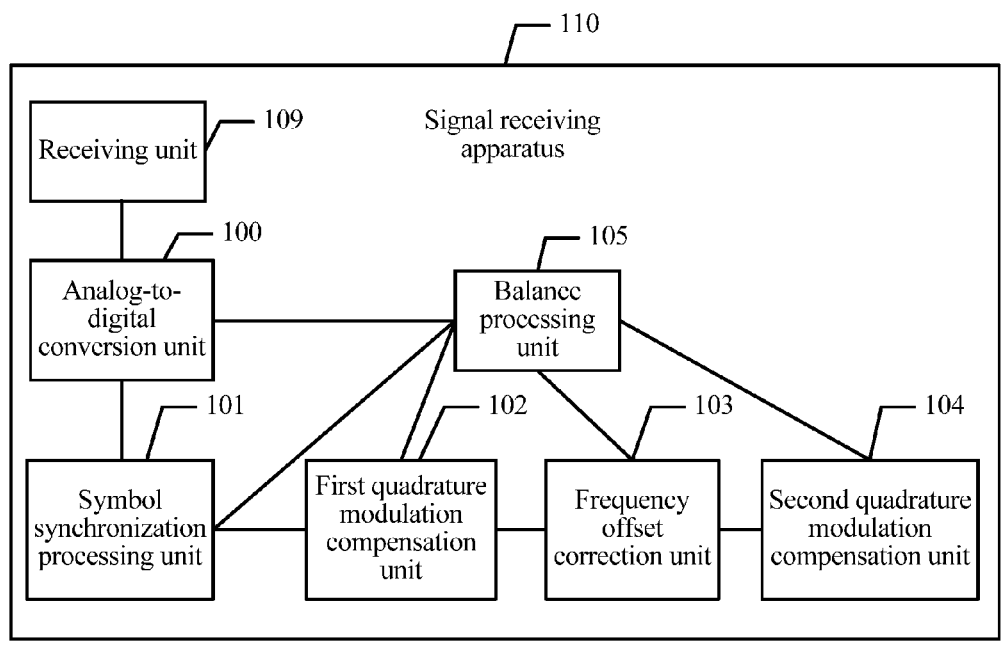
FIG. 2 is a schematic diagram of another embodiment of a signal receiving apparatus according to an embodiment of the present invention.

Referring to FIG. 2, in another embodiment of the signal receiving apparatus no, the signal receiving apparatus 110 further includes a balance processing unit 105, configured to adjust a modulus value of the first digital signal obtained after the analog-to-digital conversion unit 100 performs conversion. The second digital signal obtained after the symbol synchronization processing unit 101 performs symbol synchronization processing. The quadrature modulation compensated signal obtained after the first quadrature modulation compensation unit 102 performs processing. The frequency offset corrected signal obtained after the frequency offset correction unit 103 performs processing, or the receive end baseband signal obtained after the second quadrature modulation compensation unit 104 performs processing, so that a modulus value of the first digital signal, the second digital signal, the quadrature modulation compensated signal, the frequency offset corrected signal, or the receive end baseband signal whose modulus value is adjusted keeps consistent with a modulus value of the transmit end baseband signal.

In this embodiment of the present invention, the balance processing unit 105 needs to adjust a modulus value once, and the balance processing unit 105 may be located behind any one of the analog-to-digital conversion unit 100, the symbol synchronization processing unit 101, the first quadrature modulation compensation unit 102, the frequency offset correction unit 103, and the second quadrature modulation compensation unit 104.

Figure 3:
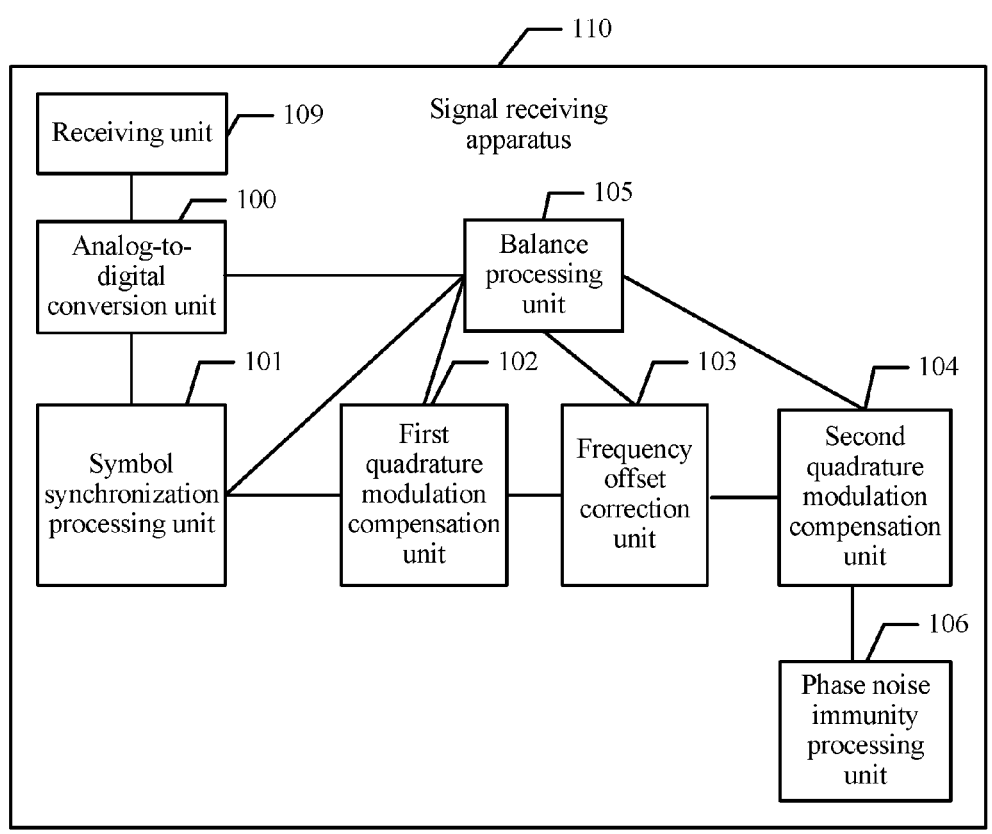
FIG. 3 is a schematic diagram of another embodiment of a signal receiving apparatus according to an embodiment of the present invention.

Optionally, based on the foregoing embodiment corresponding to FIG. 2, referring to FIG. 3, in an embodiment of the signal receiving apparatus 110 provided in the embodiment of the present invention, the signal receiving apparatus 110 further includes a phase noise immunity processing unit 106, configured to perform phase adjustment on the receive end baseband signal obtained after the second quadrature modulation compensation unit 104 performs processing, so that the receive end baseband signal whose phase is adjusted keeps consistent with a phase of the transmit end baseband signal.

Figure 4:
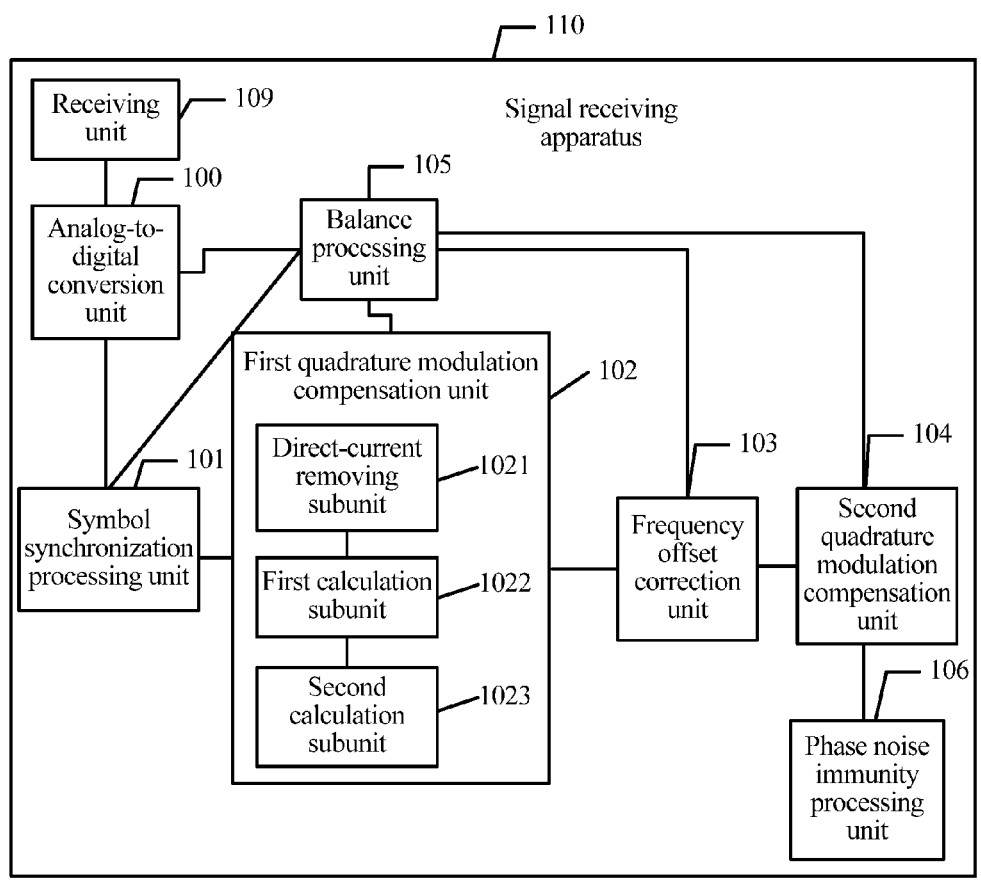
FIG. 4 is a schematic diagram of another embodiment of a signal receiving apparatus according to an embodiment of the present invention.

Optionally, based on the foregoing embodiment corresponding to FIG. 3, referring to FIG. 4, in an embodiment of the signal receiving apparatus 110 provided in the embodiment of the present invention, the first quadrature modulation compensation unit 102 includes a direct-current removing subunit 1021, a first calculation subunit 1022, and a second calculation subunit 1023.

The direct-current removing subunit 1021 is configured to perform direct-current component removing processing on the second digital signal obtained after the symbol synchronization processing unit 101 performs symbol synchronization processing, to obtain a distorted signal before correction.

The first calculation subunit 1022 is configured to obtain a receive end correction coefficient by calculation according to the distorted signal before correction that is obtained after the direct-current removing subunit 1021 performs direct-current removing, where the receive end correction coefficient is a ratio of an autocorrelation value of the distorted signal before correction to a cross-correlation value of the distorted signal before correction and an image of the distorted signal before correction.

For example, it is assumed that a distorted signal before receive end quadrature modulation compensation Rx_QMC correction is U(n), an image of the distorted signal is represented as U*(n), an undistorted signal is S(n), an image of the undistorted signal is S*(n), and it may be known from the assumption that $$E[S(n) \cdot (S^*(n))^*] = E[S(n) \cdot S(n)] = E[S^*(n) \cdot S^*(n)] = 0$$

The distorted signal may be represented as $U(n) = k_1 S(n) + k_2 S^*(n)$, where $k_1$ and $k_2$ are complex coefficients of the signal and the image.

The receive end correction coefficient may be obtained by performing a division operation after a correlation operation is performed on the distorted signal. The receive end correction coefficient may be expressed as:

$$Ch\_QMC = \frac{E[U(n) \cdot U(n)]}{E[U(n) \cdot U^*(n)]}.$$

The second calculation subunit 1023 is configured to obtain the quadrature modulation compensated signal by calculation according to the distorted signal before correction, the image of the distorted signal before correction, the receive end correction coefficient obtained by calculation by the first calculation subunit 1022, and the image of the distorted signal before correction. The quadrature modulation compensated signal is a difference between the distorted signal before correction and the receive end image component. The receive end image component is a product of the receive end correction coefficient and the image of the distorted signal before correction.

A process of calculating the quadrature modulation compensated signal according to the receive end correction coefficient may be as follows. The product of the receive end correction coefficient and the image of the distorted signal before correction is subtracted from the distorted signal before correction. Consequently, the quadrature modulation compensated signal from which the receive end image component is removed can be obtained. This may be expressed as: Rx_QMC_out (n)=U(n)−Ch_QMC·U*(n)

It is particularly noted that the first calculation subunit and the second calculation subunit actually may be embodied as one processor in hardware.

In this embodiment of the present invention, an adaptive iteration algorithm may be used for calculating the receive end correction coefficient, where the adaptive iteration algorithm may be a least mean square (LMS) algorithm, a Newton gradient iteration algorithm, a modified conjugate gradient method for a least square (LS) solution, or the like.

Optionally, based on the foregoing embodiment corresponding to FIG. 4, in an embodiment of the signal receiving apparatus 110, the direct-current removing subunit 1021 is configured to perform the following: collect statistics about a direct-current amount of N signal points of the second digital signal obtained after symbol synchronization processing, where a value of N is corresponding to a preset length of direct-current statistics collection signal points; divide the direct-current amount of the N signal points by the preset length of the direct-current statistics collection signal points to obtain a direct-current component; and subtract the direct-current component from each signal point to obtain the distorted signal before correction.

Figure 5:
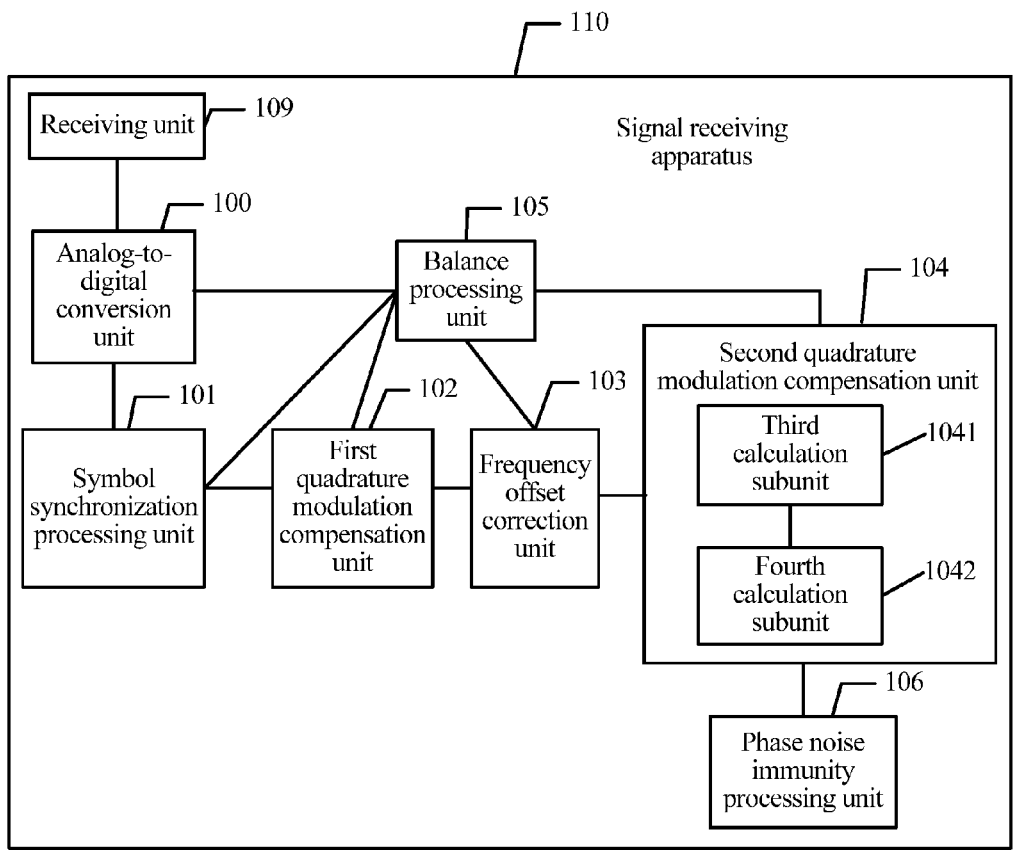
FIG. 5 is a schematic diagram of another embodiment of a signal receiving apparatus according to an embodiment of the present invention.

Optionally, based on the foregoing embodiment corresponding to FIG. 3, referring to FIG. 5, in an embodiment of the signal receiving apparatus 110, the second quadrature modulation compensation unit 104 includes the following: a third calculation subunit 1041, configured to obtain an optimal transmit end correction coefficient by calculation according to an adaptive iteration algorithm; and a fourth calculation subunit 1042, configured to obtain the receive end baseband signal by calculation according to the frequency offset corrected signal obtained after the frequency offset correction unit 103 performs processing, an image of the frequency offset corrected signal, and the optimal transmit end correction coefficient obtained by calculation by the third calculation subunit 1041. The receive end baseband signal is a difference between the frequency offset corrected signal and the receive end image component, and the receive end image component is a product of the optimal transmit end correction coefficient and the image of the frequency offset corrected signal.

In this embodiment of the present invention, an adaptive iteration algorithm may be used for calculating the optimal transmit end correction coefficient, where the adaptive iteration algorithm may be a least mean square (LMS) algorithm, a Newton gradient iteration algorithm, a modified conjugate gradient method for a least square (LS) solution, or the like.

Optionally, based on the foregoing embodiment corresponding to FIG. 5, in an embodiment of the signal receiving apparatus 110, the third calculation subunit 1041 is configured to perform the following: obtain a compensation coefficient increment by using a hard decision process, where the compensation coefficient increment is a product of a quantized value of an input signal in hard decision, an iteration step, and a difference that is obtained by calculation, the difference that is obtained by calculation is a difference between a quantized value of an output signal in hard decision and the quantized value of the input signal in hard decision, the input signal has already been aligned with the output signal before the difference is obtained, the iteration step is used to adjust a transmit end correction coefficient, and a compensation coefficient increment obtained at the first time is the first transmit end correction coefficient. The third calculation subunit 1401 is also configured to update the transmit end correction coefficient by accumulating the compensation coefficient increment, until the optimal transmit end correction coefficient is obtained.

In this embodiment of the present invention, it may be generally considered that hard decision is performing quantization of limited N bits on a signal output by a demodulator, a signal greater than a threshold value is considered as 1, and a signal less than a threshold value is considered as 0. For the most common binary, signals output by the demodulator for use in hard decision are limited to values 0 and 1.

Hard decision is a well-known technology in the art, and details are not described herein.

The optimal transmit end correction coefficient is obtained by continuous convergences according to the least mean square (LMS) algorithm in the prior art.

Figure 6:
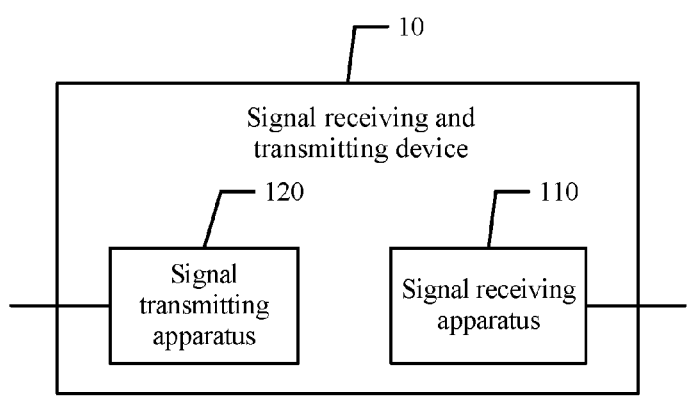
FIG. 6 is a schematic diagram of an embodiment of a signal receiving and transmitting device according to an embodiment of the present invention.

Referring to FIG. 6, a signal receiving and transmitting device 10 provided in an embodiment of the present invention includes a signal receiving apparatus 110 and a signal transmitting apparatus 120, where a signal transmitting apparatus in a signal receiving and transmitting device is communicatively connected to a signal receiving apparatus in another signal receiving and transmitting device.

The signal transmitting apparatus 120 is configured to: generate a transmit end baseband signal, and after processing the transmit end baseband signal into a radio frequency signal, transmit the radio frequency signal, where the transmit end baseband signal becomes an analog signal after the signal transmitting apparatus 120 performs digital-to-analog conversion, and the analog signal becomes the radio frequency signal after the signal transmitting apparatus performs up-conversion processing; and generate a transmit end image component before up-conversion processing.

The signal receiving apparatus 110 is configured to perform the following: Receive the radio frequency signal sent by the signal transmitting apparatus, where the radio frequency signal is obtained after the signal transmitting apparatus processes the transmit end baseband signal, the radio frequency signal includes the transmit end image component, and the transmit end image component is generated before the signal transmitting apparatus performs up-conversion processing on the analog signal generated after the signal transmitting apparatus performs digital-to-analog conversion on the transmit end baseband signal, and is an interference signal that is conjugate with the analog signal. Convert the radio frequency signal into a first digital signal. Perform symbol synchronization processing on the first digital signal obtained after analog-to-digital conversion, to obtain a second digital signal. A rate at which the second digital signal runs in the signal receiving apparatus keeps consistent with a rate at which the transmit end baseband signal runs in the signal transmitting apparatus. The second digital signal includes a receive end image component, and the receive end image component is generated after the signal receiving apparatus performs down-conversion processing on the received radio frequency signal, and is an interference signal that is conjugate with a low frequency signal generated after down-conversion processing is performed on the radio frequency signal.

Remove the receive end image component from the second digital signal obtained after symbol synchronization processing, to obtain a quadrature modulation compensated signal. Perform frequency adjustment on the quadrature modulation compensated signal, so that a frequency of a frequency offset corrected signal obtained after adjustment is the same as a frequency of the transmit end baseband signal. Remove the transmit end image component from the frequency offset corrected signal obtained after adjustment, to obtain a receive end baseband signal.

Figure 7:
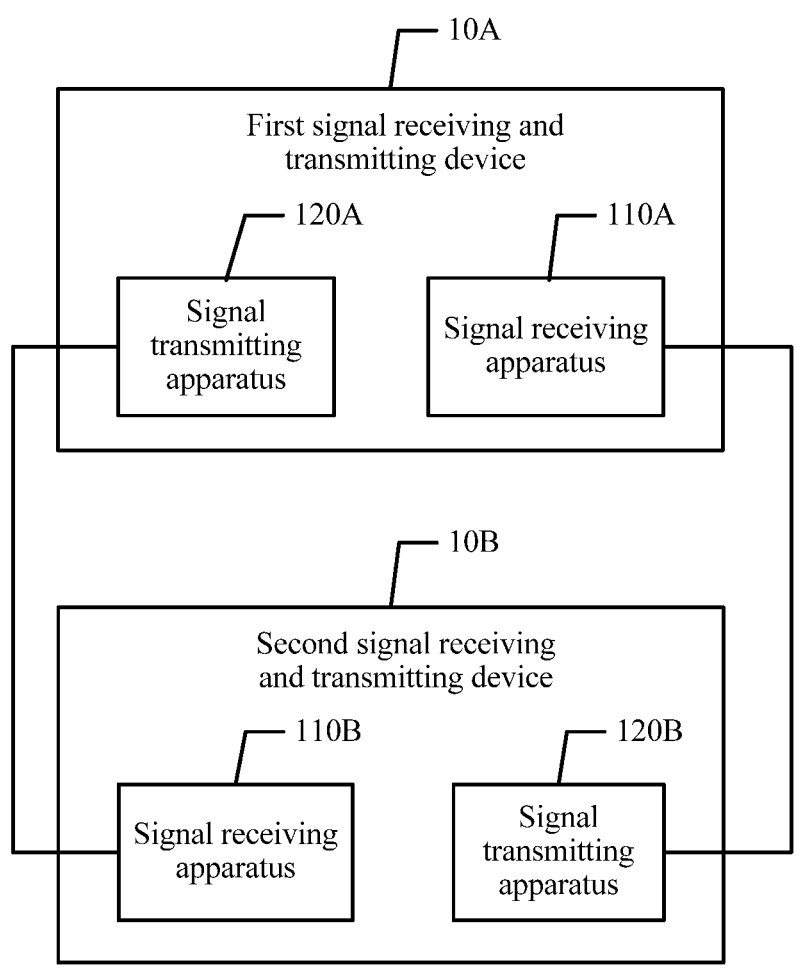
FIG. 7 is a schematic diagram of an embodiment of communication between signal receiving and transmitting devices according to an embodiment of the present invention.

Referring to FIG. 7, an embodiment of a communications system provided in an embodiment of the present invention includes a first signal receiving and transmitting device 10A and a second signal receiving and transmitting device 10B. There may be multiple signal receiving and transmitting devices in the communications system, and in this embodiment of the present invention, only two signal receiving and transmitting devices are used as an example to describe a working process of the two signal receiving and transmitting devices.

In a process of communication between the first signal receiving and transmitting device 10A and the second signal receiving and transmitting device 10B, a signal transmitting apparatus 120A of the first signal receiving and transmitting device 10A processes a transmit end baseband signal into a radio frequency signal and transmits the radio frequency signal. A receive end apparatus 110B of the second signal receiving and transmitting device 10B receives the radio frequency signal, and processes the radio frequency signal to obtain a receive end baseband signal.

Figure 8:
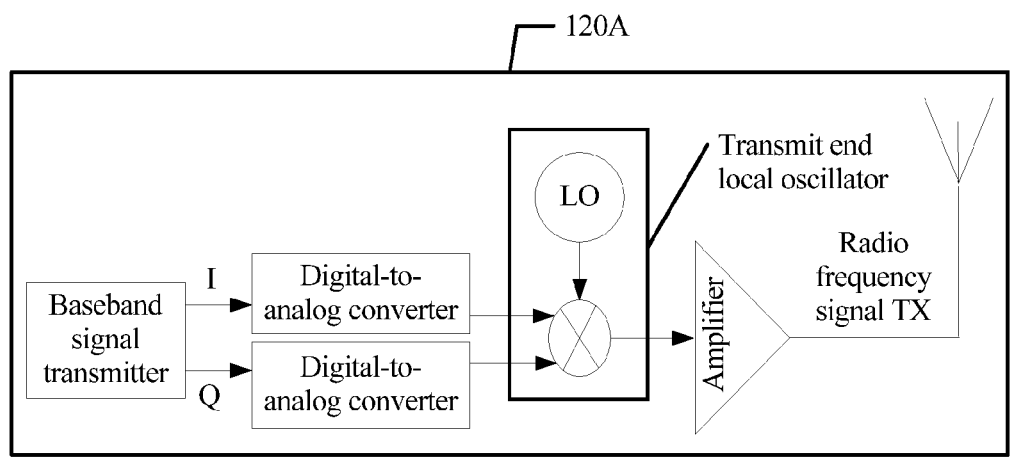
FIG. 8 is a schematic diagram of a working principle of a transmit end of a signal receiving and transmitting device according to an embodiment of the present invention.

For a process in which the transmit end apparatus 120A processes the transmit end baseband signal into the radio frequency signal and transmits the radio frequency signal, reference may be made to FIG. 8 for understanding.

As shown in FIG. 8, a baseband signal transmitter transmits an I baseband signal and a Q baseband signal. It is assumed that data of each signal point of the I signal and the Q signal is 1+j. The I baseband signal and the Q baseband signal are respectively converted into analog signals by digital-to-analog converters, and the two analog signals become one high frequency analog signal after a transmit end local oscillator (LO) performs up-conversion. In the high frequency analog signal, because the I signal and the Q signal may generate different direct-current offset components in a transmission process, and amplitude gains of the I signal and the Q signal are also different, the I signal and the Q signal are imbalanced. Such imbalance between the I signal and the Q signal may cause a transmit end image component before the transmit end LO performs up-conversion, and therefore, the transmit end image component may exist in the high frequency analog signal. Data of a signal point at which the transmit end image component is introduced may change to 1+0.95j, changes of data of each signal points may be different, and data of some signal points may change to 0.95+j or another value. The high frequency analog signal becomes a radio frequency signal TX after a power amplifier performs power amplification, and is transmitted from a transmit end antenna 200A.

Figure 9:
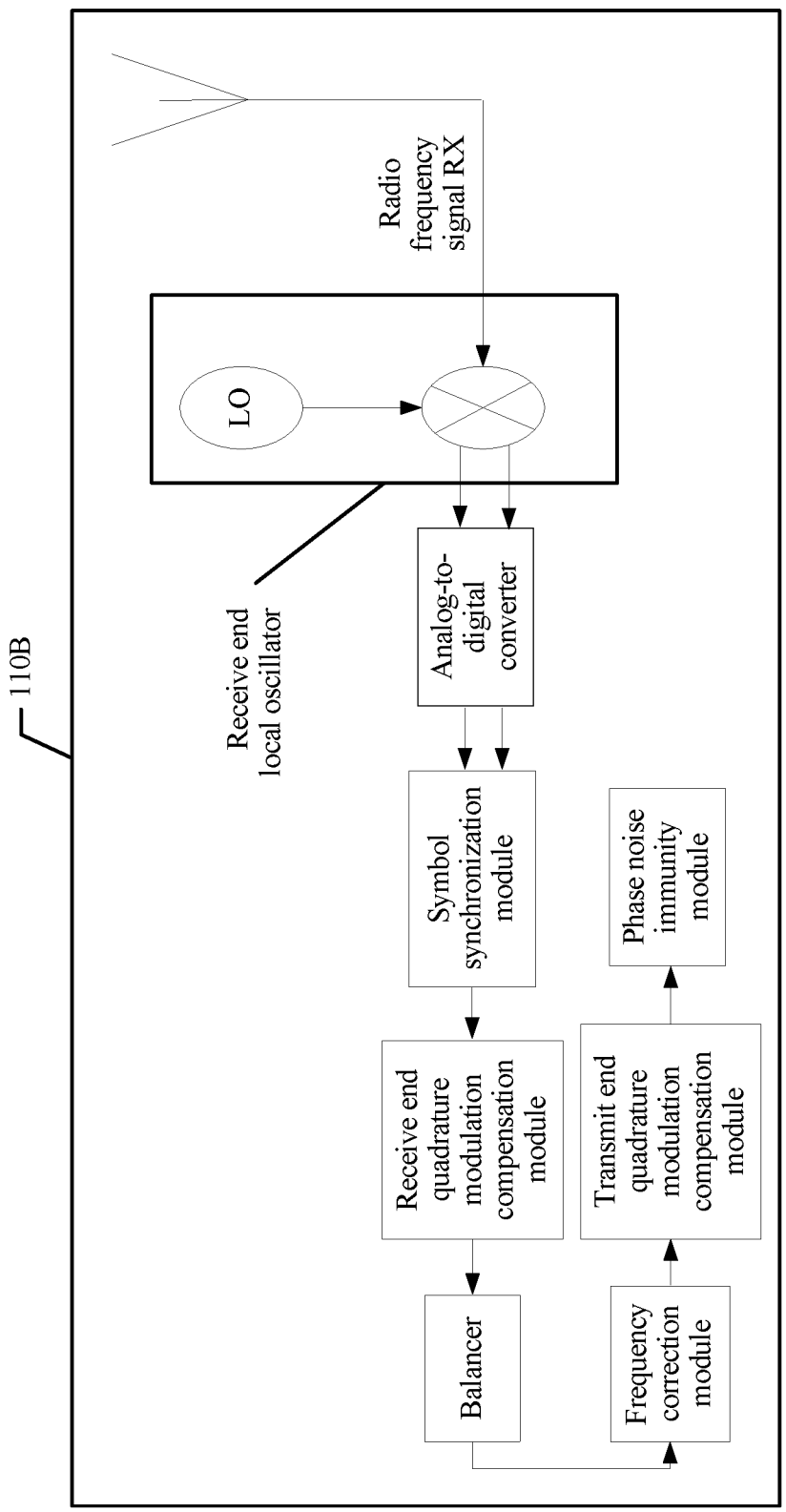
FIG. 9 is a schematic diagram of a working principle of a receive end of a signal receiving and transmitting device according to an embodiment of the present invention.

For a process in which the receive end apparatus 110B receives the radio frequency signal and processes the radio frequency signal to obtain the receive end baseband signal, reference may be made to FIG. 9 for understanding.

The radio frequency signal of the transmit end apparatus 120A arrives at an antenna of the receive end apparatus 110B after spatial transmission, and becomes a radio frequency signal RX after being received by the receive end 110B. A receive end LO performs down-conversion on the radio frequency signal RX and separates an I analog signal and a Q analog signal to obtain two low frequency analog signals. A receive end image component may be introduced after the receive end LO performs down-conversion on the radio frequency signal RX, and therefore, the receive end image component exists in the two low frequency analog signals. It is assumed that an original signal data point at which the transmit end image component is introduced is 1+0.95j, after the receive end image component is introduced, the signal data point may become 1+0.9j, and the I low frequency analog signal and the Q low frequency analog signal are respectively converted into an I digital signal and a Q digital signal by analog-to-digital converters. The I digital signal and the Q digital signal enter a symbol synchronization module, and the symbol synchronization module adjusts clocks for the I digital signal and the Q digital signal, so that a speed at which the receive end apparatus 110B receives the digital signals keeps consistent with a speed at which the transmit end apparatus 120A transmits the transmit end baseband signal. For example, the frequency at which the transmit end apparatus 120A transmits the baseband signal is 1 GHz, the speed at which the receive end apparatus 110B receives the digital signal may be kept at 1 ns by using the symbol synchronization module, so as to ensure that a signal point cannot be lost or misplaced. The digital signal on which symbol synchronization is performed arrives at a receive end quadrature modulation compensation module, and the receive end quadrature modulation compensation module performs blind correction on the synchronized digital signal, and performs receive end image component removing processing to obtain a quadrature modulation compensated signal. It is assumed that data of a signal point from which the receive end image is not removed is 1+0.9j, and data of a signal point from which the receive end image component is removed restores to 1+0.95j. The quadrature modulation compensated signal arrives at a balancer, and the balancer performs balance processing to remove an imbalanced signal introduced because of intersymbol interference when the transmit end baseband signal is received by the signal receiving apparatus 110B, so that a modulus value of the quadrature modulation compensated signal keeps consistent with a modulus value of the transmit end baseband signal. For example, data of an original signal point is 1+j, and a modulus value is $\sqrt{2}$. Because of intersymbol interference, the modulus value of the data of the signal point may change, for example, changes to $\sqrt{2}/0.99$. The balancer removes an imbalanced signal introduced because of intersymbol interference, so that the modulus value returns to $\sqrt{2}$. The quadrature modulation compensated signal on which the balancer performs processing arrives at a frequency offset correction module for frequency offset correction. Frequency offset correction is to adjust a phase of a signal. For example, an original phase of a signal point whose data is 1+j is 45 degrees, a phase becomes 50 degrees after the signal arrives at the frequency offset correction module, and the frequency offset correction module needs to adjust, to 45 degrees, the phase of the signal on which frequency offset correction needs to be performed, so that the signal becomes a frequency offset corrected signal. The frequency offset corrected signal arrives at a transmit end quadrature modulation compensation module, and the transmit end quadrature modulation compensation module removes the transmit end image component from the frequency offset corrected signal to obtain a receive end baseband signal. A signal data point from which the receive end image component is removed is 1+0.95j, and after the transmit end image component is removed, the signal data point becomes 1+j. However, in an actual transmission process, it is impossible to completely correct the receive end baseband signal. In this case, phase jitter and noise exist in the receive end baseband signal, and a phase noise immunity module performs phase noise immunity processing on the receive end signal to compensate a jitter phase and remove the noise, so that the receive end baseband signal is stable. If an original transmit end baseband signal is 1+j, only the receive end baseband signal on which phase noise immunity processing is performed becomes 1+j, or infinitely approaches 1+j.

Figure 10:
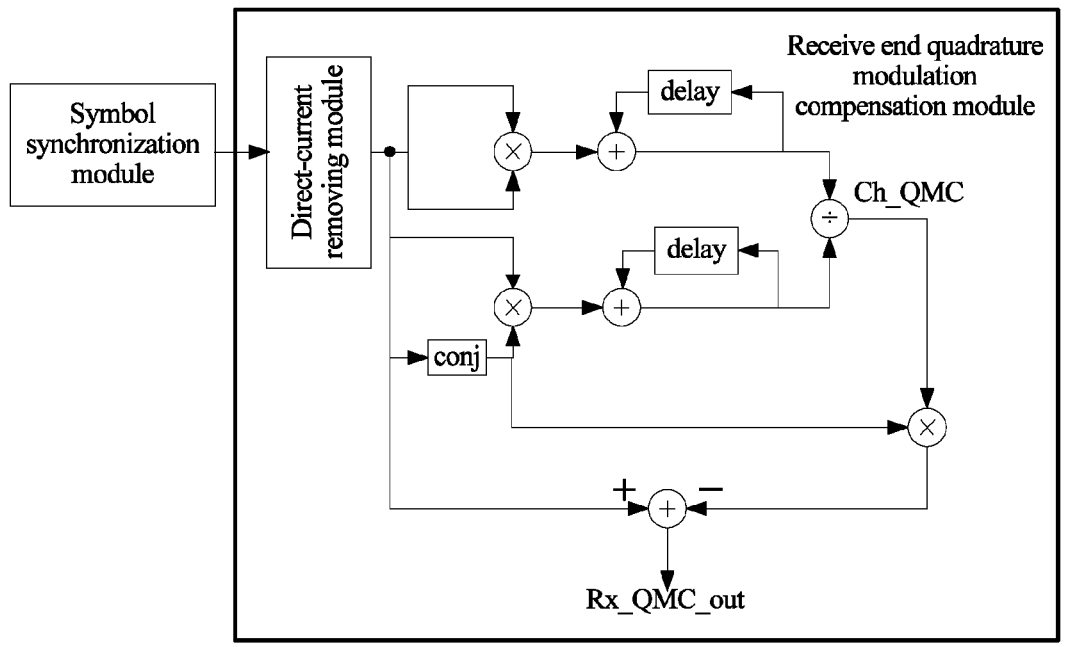

FIG. 10 is a principle diagram of removing a receive end image component by the receive end quadrature modulation compensation module in FIG. 9. Referring to FIG. 10, a symbol synchronization module performs symbol synchronization processing on a digital signal obtained after analog-to-digital conversion. The digital signal on which symbol synchronization processing is performed enters a direct-current removing module in the receive end quadrature modulation compensation module. The direct-current removing module can implement two functions, where one function is direct-current calculation, and the other function is direct-current removing. An implementation process of direct-current calculation is as follows: A developer first presets a length of direct-current statistics collection signal points, and if the preset quantity is N, each time statistics about N signal points are collected, a direct-current amount of the N signal points is obtained by calculation. The direct-current amount of the N signal points is divided by the preset length of the direct-current statistics collection signal points to obtain a latest direct-current component, and the latest direct-current component is subtracted from each signal point; in this case, a direct-current removing process is implemented.

For a process of removing an image component from a signal on which direct-current removing is performed, in an implementation solution herein, it is assumed that an ideal signal and an image of the ideal signal are uncorrelated, and a ratio of an autocorrelation value of a signal to a cross-correlation value of the signal and an image of the signal is obtained by using such a condition, and used as a correction coefficient Ch_QMC.

For example, it is assumed that a distorted signal before receive end quadrature modulation compensation Rx_QMC correction is U(n), an image of the distorted signal is U*(n), an undistorted signal is S(n), and an image of the undistorted signal is S*(n). It may be known from the assumption that $$E[S(n)\cdot(S^*(n))^*]=E[S(n)\cdot S(n)]=E[S^*(n)\cdot S^*(n)]=0$$

The distorted signal may be represented as $U(n)=k_1 S(n)+k_2 S^*(n)$, where $k_1$ and $k_2$ are complex coefficients of the signal and the image respectively.

The receive end correction coefficient may be obtained by performing a division operation after a correlation operation is performed on the distorted signal. This may be expressed as:

$$Ch\_QMC = \frac{E[U(n)\cdot U(n)]}{E[U(n)\cdot U^*(n)]}.$$

A process of calculating the quadrature modulation compensated signal according to the receive end correction coefficient may be: The product of the receive end correction coefficient and the image of the distorted signal before correction is subtracted from the distorted signal before correction, to obtain the quadrature modulation compensated signal from which the receive end image component is removed. This may be expressed as: $Rx\_QMC\_out(n)=U(n)-Ch\_QMC\cdot U^*(n)$.

Figure 11:
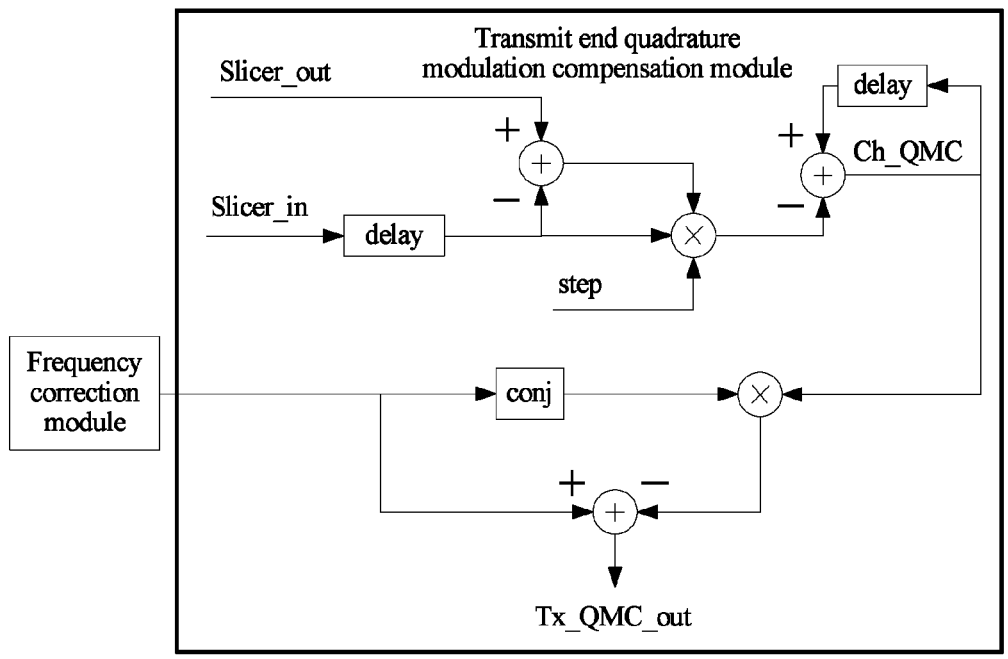
FIG. 11 is a schematic diagram of a principle of quadrature modulation compensation at a transmit end according to an embodiment of the present invention.

The foregoing part describes a process of removing a receive end image component. FIG. 11 describes a process of removing a transmit end image by a transmit end quadrature modulation compensation module in an embodiment of the present invention.

Referring to FIG. 11, Slicer_in and Slicer_out are respectively an input signal and an output signal in hard decision performed by the transmit end quadrature modulation compensation module. Because the input signal Slicer_in precedes the output signal Slicer_out, a delay module performs delay processing on the Slicer_in signal, so that the Slicer_in signal is aligned with the Slicer_out signal. After the two are aligned, a subtraction operation is performed on a quantized value of the Slicer_out signal and a quantized value of the Slicer_in signal to obtain an error signal quantized value e, and a compensation coefficient increment is obtained by multiplying the error signal quantized value e by the quantized value of the Slicer_in signal and a step. A transmit end correction coefficient is continually updated by using a following accumulator to accumulate a compensation coefficient increment obtained in each iteration.

A transmit end image component is obtained by multiplying the transmit end correction coefficient by a conjugated item of a frequency offset corrected signal obtained after frequency offset correction. The transmit end image component is removed by subtracting the transmit end image component from the frequency offset corrected signal.

The foregoing part is a process of one iteration. The transmit end correction coefficient is continually updated by means of repeated iterations, and finally, an optimal weight is obtained by means of convergence. The step is an iteration step and is relatively small generally, and a typical value is $2^{-15}$. A convergence speed may be adjusted by changing a value of the step. A larger Step indicates a higher convergence speed and a larger steady state error, and a smaller Step indicates a lower convergence speed and a smaller steady state error.

Figure 12:
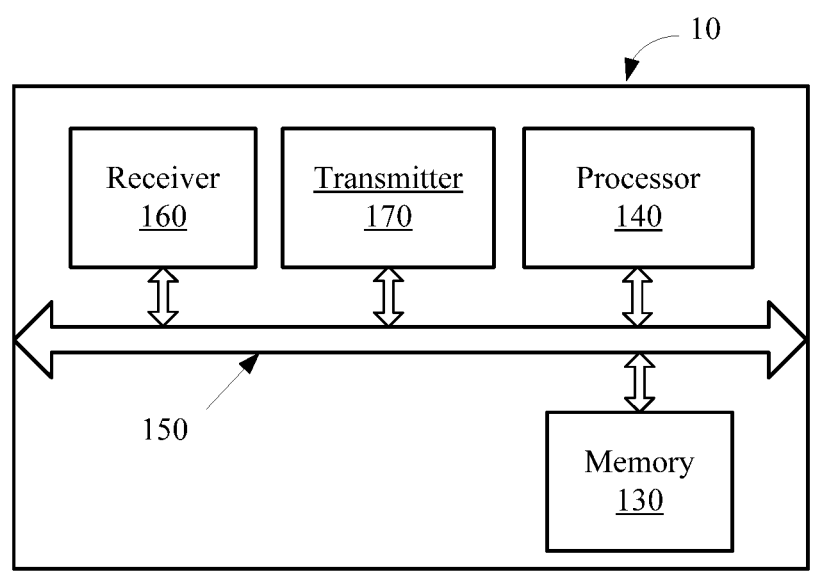
FIG. 12 is a schematic diagram of another embodiment of a signal receiving and transmitting device according to an embodiment of the present invention.

FIG. 12 is a schematic structural diagram of a signal receiving and transmitting device 10 according to an embodiment of the present invention. The signal receiving and transmitting device 10 may include: a receiver 160, a transmitter 170, a processor 140, and a memory 130, where both the receiver 160 and the transmitter 170 may be antennas.

The receiver 160 is configured to receive a radio frequency signal transmitted by another signal receiving and transmitting device.

The transmitter 170 is configured to transmit a radio frequency signal to another signal receiving and transmitting device.

The memory 130 may include a read-only memory and a random access memory, and provides an instruction and data to the processor 140. A part of the memory 130 may further include a non-volatile random access memory (NVRAM).

The memory 130 stores the following elements, and an executable module or a data structure, a subset of an executable module or a data structure, or an extension set of an executable module or a data structure.

An operating instruction includes various operating instructions, which are used to implement various operations.

An operating system includes various system programs, which are used to implement various basic services and process hardware-based tasks.

In this embodiment of the present invention, the processor 140 executes the following operations by invoking the operating instruction stored in the memory 130 (the operating instruction may be stored in the operating system): Converting the radio frequency signal received by the receiver 160 from the another signal receiving and transmitting device into a first digital signal. Performing symbol synchronization processing on the first digital signal obtained after analog-to-digital conversion, to obtain a second digital signal. A rate at which the second digital signal runs in the signal receiving apparatus keeps consistent with a rate at which the transmit end baseband signal runs in the signal transmitting apparatus. The second digital signal includes a receive end image component. The receive end image component is generated after the signal receiving apparatus performs down-conversion processing on the received radio frequency signal, and is an interference signal that is conjugate with a low frequency signal generated after down-conversion processing is performed on the radio frequency signal. Removing the receive end image component from the second digital signal obtained after symbol synchronization processing, to obtain a quadrature modulation compensated signal. Performing frequency adjustment on the quadrature modulation compensated signal, so that a frequency of a frequency offset corrected signal obtained after adjustment is the same as a frequency of the transmit end baseband signal. Removing the transmit end image component from the frequency offset corrected signal obtained after frequency offset adjustment, to obtain a receive end baseband signal.

Compared with a solution in the prior art that a feedback module and a coupling module are added to perform signal correction, the signal receiving apparatus provided in this embodiment of the present invention can remove image components by performing quadrature modulation compensation twice on a radio frequency signal received from a signal transmitting apparatus, thereby improving signal quality and reducing complexity of hardware design.

The processor 140 controls an operation of the signal receiving and transmitting device 10, and the processor 140 may be further referred to as a CPU (Central Processing Unit). The memory 130 may include a read-only memory and a random access memory, and provides an instruction and data to the processor 140. A part of the memory 130 may further include a non-volatile random access memory (NVRAM). In a specific application, the components of the signal receiving and transmitting device 10 are coupled together by using a bus system 150, where the bus system 150 may further include a power bus, a control bus, a status signal bus, and the like in addition to a data bus. However, for clear description, various types of buses in the figure are marked as the bus system 150.

The method disclosed in the foregoing embodiments of the present invention may be applied to the processor 140, or implemented by the processor 140. The processor 140 may be an integrated circuit chip and has a signal processing capability. In an implementation process, steps in the foregoing method may be completed by using an integrated logic circuit of hardware in the processor 140 or an instruction in a form of software. The foregoing processor 140 may be a general purpose processor, a digital signal processor (DSP), an application-specific integrated circuit (ASIC), a field programmable gate array (FPGA) or another programmable logical device, a discrete gate or a transistor logical device, or a discrete hardware component. The processor 140 may implement or execute a method, steps, and logical block diagrams disclosed in the embodiments of the present invention. The general purpose processor may be a microprocessor or the processor may be any conventional processor or the like. Steps of the method disclosed with reference to the embodiment of the present invention may be directly executed and completed by means of a hardware decoding processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 130, and the processor 140 reads information in the memory 130 and completes the steps in the method in combination with the hardware of the processor 140.

Optionally, the processor 140 is further configured to adjust a modulus value of the first digital signal obtained after analog-to-digital conversion, the second digital signal obtained after symbol synchronization processing, the quadrature modulation compensated signal, the frequency offset corrected signal, or the receive end baseband signal, so that a modulus value of the first digital signal, the second digital signal, the quadrature modulation compensated signal, the frequency offset corrected signal, or the receive end baseband signal whose modulus value is adjusted keeps consistent with a modulus value of the transmit end baseband signal.

Optionally, the processor 140 is further configured to perform phase adjustment on the receive end baseband signal, so that the receive end baseband signal whose phase is adjusted keeps consistent with a phase of the transmit end baseband signal.

Optionally, the processor 140 is configured to: perform direct-current component removing processing on the second digital signal obtained after symbol synchronization processing, to obtain a distorted signal before correction; obtain a receive end correction coefficient by calculation according to the distorted signal before correction that is obtained after direct-current removing, where the receive end correction coefficient is a ratio of an autocorrelation value of the distorted signal before correction to a cross-correlation value of the distorted signal before correction and an image of the distorted signal before correction; and obtain the quadrature modulation compensated signal by calculation according to the distorted signal before correction, the image of the distorted signal before correction, the receive end correction coefficient, and the image of the distorted signal before correction. The quadrature modulation compensated signal is a difference between the distorted signal before correction and the receive end image component, and the receive end image component is a product of the receive end correction coefficient and the image of the distorted signal before correction.

Optionally, the processor 140 is configured to: collect statistics about a direct-current amount of N signal points of the second digital signal obtained after symbol synchronization processing, where a value of N is corresponding to a preset length of direct-current statistics collection signal points; divide the direct-current amount of the N signal points by the preset length of the direct-current statistics collection signal points to obtain a direct-current component; and subtract the direct-current component from each signal point to obtain the distorted signal before correction.

Optionally, the processor 140 is configured to: obtain an optimal transmit end correction coefficient by calculation according to an adaptive iteration algorithm; and obtain the receive end baseband signal by calculation according to the frequency offset corrected signal, an image of the frequency offset corrected signal, and the optimal transmit end correction coefficient, where the receive end baseband signal is a difference between the frequency offset corrected signal and the receive end image component, and the receive end image component is a product of the optimal transmit end correction coefficient and the image of the frequency offset corrected signal.

Optionally, the processor 140 is configured to: obtain a compensation coefficient increment by using a hard decision process, where the compensation coefficient increment is a product of a quantized value of an input signal in hard decision, an iteration step, and a difference that is obtained by calculation, the difference that is obtained by calculation is a difference between a quantized value of an output signal in hard decision and the quantized value of the input signal in hard decision, the input signal has already been aligned with the output signal before the difference is obtained, the iteration step is used to adjust a transmit end correction coefficient, and a compensation coefficient increment obtained at the first time is the first transmit end correction coefficient; and update the transmit end correction coefficient by accumulating the compensation coefficient increment, until the optimal transmit end correction coefficient is obtained.

Figure 13:
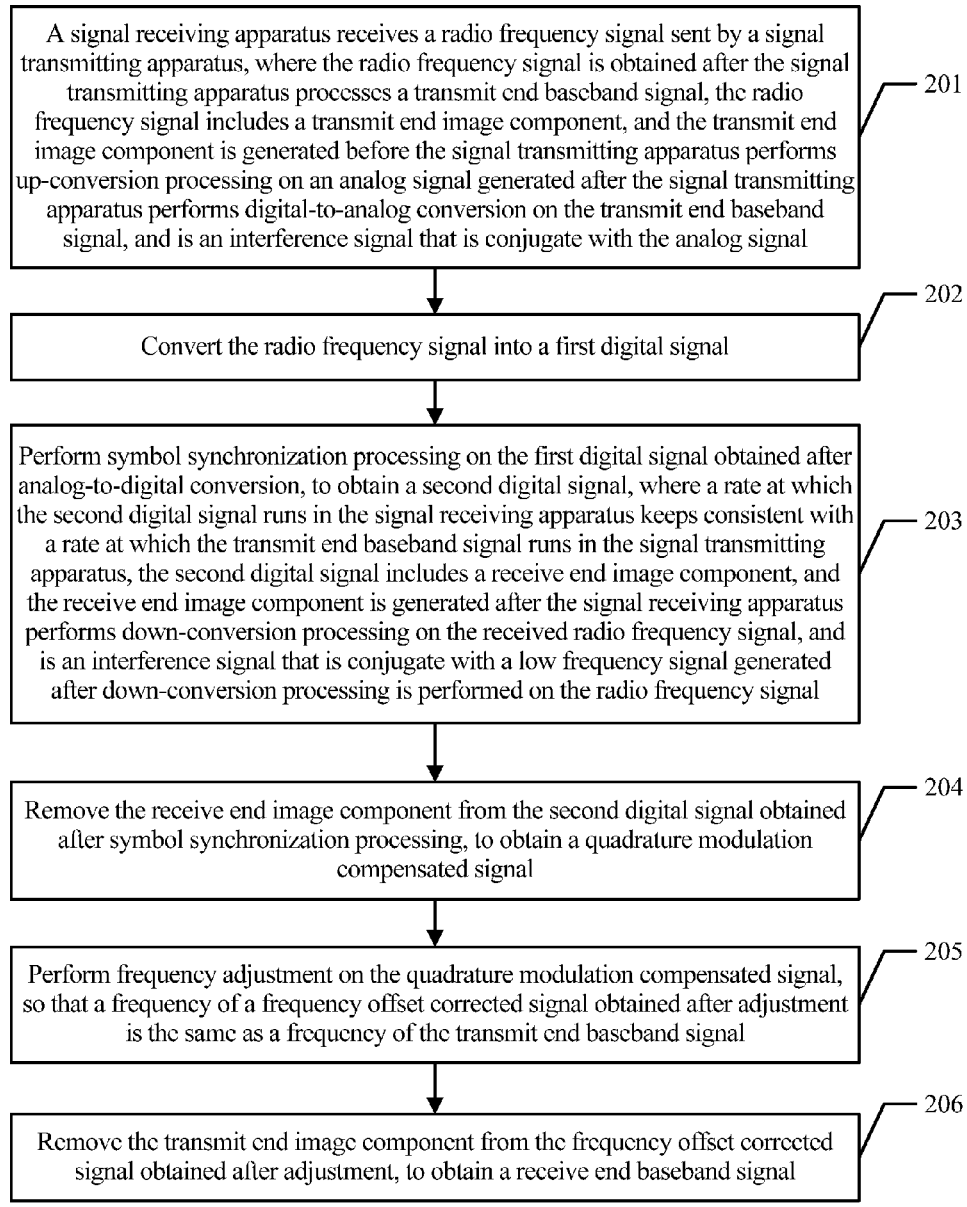
FIG. 13 is a schematic diagram of an embodiment of a zero intermediate frequency signal correction method according to an embodiment of the present invention.

Referring to FIG. 13, an embodiment of a zero intermediate frequency signal correction method provided in an embodiment of the present invention includes the following.

201. A signal receiving apparatus receives a radio frequency signal sent by a signal transmitting apparatus, where the radio frequency signal is obtained after the signal transmitting apparatus processes a transmit end baseband signal. The radio frequency signal includes a transmit end image component. The transmit end image component is generated before the signal transmitting apparatus performs up-conversion processing on an analog signal generated after the signal transmitting apparatus performs digital-to-analog conversion on the transmit end baseband signal, and is an interference signal that is conjugate with the analog signal.

202. Convert the radio frequency signal into a first digital signal.

203. Perform symbol synchronization processing on the first digital signal obtained after analog-to-digital conversion, to obtain a second digital signal. A rate at which the second digital signal runs in the signal receiving apparatus keeps consistent with a rate at which the transmit end baseband signal runs in the signal transmitting apparatus, the second digital signal includes a receive end image component. The receive end image component is generated after the signal receiving apparatus performs down-conversion processing on the received radio frequency signal, and is an interference signal that is conjugate with a low frequency signal generated after down-conversion processing is performed on the radio frequency signal.

204. Remove the receive end image component from the second digital signal obtained after symbol synchronization processing, to obtain a quadrature modulation compensated signal.

205. Perform frequency adjustment on the quadrature modulation compensated signal, so that a frequency of a frequency offset corrected signal obtained after adjustment is the same as a frequency of the transmit end baseband signal.

206. Remove the transmit end image component from the frequency offset corrected signal obtained after adjustment, to obtain a receive end baseband signal.

Compared with a solution in the prior art that a feedback module and a coupling module are added to perform signal correction, in the zero intermediate frequency signal correction method provided in this embodiment of the present invention, image components can be removed by performing quadrature modulation compensation twice on a radio frequency signal received from a signal transmitting apparatus, thereby improving signal quality and reducing complexity of hardware design.

Optionally, based on the foregoing embodiment corresponding to FIG. 13, in another embodiment of the zero intermediate frequency signal correction method provided in the embodiment of the present invention, the method may further include adjusting a modulus value of the first digital signal obtained after analog-to-digital conversion, the second digital signal obtained after symbol synchronization processing, the quadrature modulation compensated signal, the frequency offset corrected signal, or the receive end baseband signal, so that a modulus value of the first digital signal, the second digital signal, the quadrature modulation compensated signal, the frequency offset corrected signal, or the receive end baseband signal whose modulus value is adjusted keeps consistent with a modulus value of the transmit end baseband signal.

Optionally, based on the foregoing embodiment corresponding to FIG. 13 and the optional embodiment, in another embodiment of the zero intermediate frequency signal correction method provided in the embodiment of the present invention, after the removing the transmit end image component from the frequency offset corrected signal obtained after adjustment, to obtain a receive end baseband signal, the method may further include performing phase adjustment on the receive end baseband signal, so that the receive end baseband signal whose phase is adjusted keeps consistent with a phase of the transmit end baseband signal.

Optionally, based on the foregoing embodiment corresponding to FIG. 13 and optional embodiments, in another embodiment of the zero intermediate frequency signal correction method provided in the embodiment of the present invention, the removing the receive end image component from the second digital signal obtained after symbol synchronization processing, to obtain a quadrature modulation compensated signal may include the following. Performing direct-current component removing processing on the second digital signal obtained after symbol synchronization processing, to obtain a distorted signal before correction. Obtaining a receive end correction coefficient by calculation according to the distorted signal before correction that is obtained after direct-current removing, where the receive end correction coefficient is a ratio of an autocorrelation value of the distorted signal before correction to a cross-correlation value of the distorted signal before correction and an image of the distorted signal before correction. Obtaining the quadrature modulation compensated signal by calculation according to the distorted signal before correction, the image of the distorted signal before correction, the receive end correction coefficient, and the image of the distorted signal before correction, where the quadrature modulation compensated signal is a difference between the distorted signal before correction and the receive end image component, and the receive end image component is a product of the receive end correction coefficient and the image of the distorted signal before correction.

The performing direct-current component removing processing on the second digital signal obtained after symbol synchronization processing, to obtain a distorted signal before correction may include the following. Collecting statistics about a direct-current amount of N signal points of the second digital signal obtained after symbol synchronization processing, where a value of N is corresponding to a preset length of direct-current statistics collection signal points. Dividing the direct-current amount of the N signal points by the preset length of the direct-current statistics collection signal points to obtain a direct-current component. Subtracting the direct-current component from each signal point to obtain the distorted signal before correction.

Optionally, based on the foregoing embodiment corresponding to FIG. 13 and optional embodiments, in another embodiment of the zero intermediate frequency signal correction method provided in the embodiment of the present invention, the performing transmit end image component removing processing on the frequency offset corrected signal, to obtain a receive end baseband signal may include the following. Obtaining an optimal transmit end correction coefficient by calculation according to an adaptive iteration algorithm; and obtaining the receive end baseband signal by calculation according to the frequency offset corrected signal, an image of the frequency offset corrected signal, and the optimal transmit end correction coefficient, where the receive end baseband signal is a difference between the frequency offset corrected signal and the receive end image component, and the receive end image component is a product of the optimal transmit end correction coefficient and the image of the frequency offset corrected signal.

The obtaining an optimal transmit end correction coefficient by calculation according to an adaptive iteration algorithm may include the following. Obtaining a compensation coefficient increment by using a hard decision process, where the compensation coefficient increment is a product of a quantized value of an input signal in hard decision, an iteration step, and a difference that is obtained by calculation, the difference that is obtained by calculation is a difference between a quantized value of an output signal in hard decision and the quantized value of the input signal in hard decision, the input signal has already been aligned with the output signal before the difference is obtained, the iteration step is used to adjust a transmit end correction coefficient, and a compensation coefficient increment obtained at the first time is the first transmit end correction coefficient; and updating the transmit end correction coefficient by accumulating the compensation coefficient increment, until the optimal transmit end correction coefficient is obtained.

For a specific process of the zero intermediate frequency signal correction method described in this embodiment of the present invention, reference may be made to a process in FIG. 8 to FIG. 11 for understanding, and details are not described herein again.

A person of ordinary skill in the art may understand that all or some of the steps of the methods in the embodiments may be implemented by a program instructing relevant hardware. The program may be stored in a computer-readable storage medium. The storage medium may include: a ROM, a RAM, a magnetic disk, or an optical disc.

The foregoing part describes in detail the zero intermediate frequency signal correction method, apparatus, and device provided in the embodiments of the present invention. In this specification, specific examples are used to describe the principle and implementation of embodiments of the present invention, and the description of the embodiments is only intended to help understand the method and core idea of the present disclosure. At the same time, a person of ordinary skill in the art may, based on the idea of the present disclosure, make modifications with respect to the specific implementation manners and the application scope. In conclusion, the content of this specification shall not be construed as a limitation to the present disclosure.

What is claimed is:

1. A device, comprising:
   a receiver is configured to receive a radio frequency signal transmitted by another device;
   a transmitter is configured to transmit a radio frequency signal to another device;
   a processor; and
   a computer-readable storage medium storing a program to be executed by the processor, the program including instructions for:
   converting the radio frequency signal received by the receiver from the another device into a first digital signal;
   performing symbol synchronization processing on the first digital signal obtained after analog-to-digital conversion, to obtain a second digital signal, wherein a rate at which the second digital signal runs in the device keeps consistent with a rate at which a transmit end baseband signal runs in the device, wherein the second digital signal comprises a receive end image component, and wherein the receive end image component is generated after the device performs down-conversion processing on the received radio frequency signal, and is an interference signal that is conjugate with a low frequency signal generated after down-conversion processing is performed on the radio frequency signal;

removing the receive end image component from the second digital signal obtained after symbol synchronization processing, to obtain a quadrature modulation compensated signal;

performing frequency adjustment on the quadrature modulation compensated signal, so that a frequency of a frequency offset corrected signal obtained after adjustment is the same as a frequency of the transmit end baseband signal; and removing a transmit end image component from the frequency offset corrected signal obtained after frequency adjustment, to obtain a receive end baseband signal.

2. The device according to claim 1, wherein the program further includes instructions for adjusting a modulus value of the first digital signal obtained after analog-to-digital conversion, so that the modulus value of the first digital signal, keeps consistent with a modulus value of the transmit end baseband signal.

3. The device according to claim 1, wherein the program further includes instructions for adjusting a modulus value of the second digital signal obtained after symbol synchronization processing, so that the modulus value of the second digital signal keeps consistent with a modulus value of the transmit end baseband signal.

4. The device according to claim 1, wherein the program further includes instructions for adjusting a modulus value of the quadrature modulation compensated signal, so that the modulus value of the quadrature modulation compensated signal keeps consistent with a modulus value of the transmit end baseband signal.

5. The device according to claim 1, wherein the program further includes instructions for adjusting a modulus value of the frequency offset corrected signal, so that the modulus value of the frequency offset corrected signal keeps consistent with a modulus value of the transmit end baseband signal.

6. The device according to claim 1, wherein the program further includes instructions for adjusting a modulus value of the receive end baseband signal, so that the modulus value of the receive end baseband signal keeps consistent with a modulus value of the transmit end baseband signal.

7. The device according to claim 1, wherein the program further includes instructions for:

performing phase adjustment on the receive end baseband signal, so that the receive end baseband signal whose phase is adjusted keeps consistent with a phase of the transmit end baseband signal.

8. The device according to claim 1, wherein the program further includes instructions for:

performing direct-current component removing processing on the second digital signal obtained after symbol synchronization processing, to obtain a distorted signal before correction;

obtaining a receive end correction coefficient by calculation according to the distorted signal before correction that is obtained after direct-current removing, wherein the receive end correction coefficient is a ratio of an autocorrelation value of the distorted signal before correction to a cross-correlation value of the distorted signal before correction and an image of the distorted signal before correction; and obtaining the quadrature modulation compensated signal by calculation according to the distorted signal before correction, the receive end correction coefficient, and the image of the distorted signal before correction, wherein the quadrature modulation compensated signal is a difference between the distorted signal before correction and the receive end image component, and wherein the receive end image component is a product of the receive end correction coefficient and the image of the distorted signal before correction.

9. The device according to claim 8, wherein the program further includes instructions for:

collecting statistics about a direct-current amount of N signal points of the second digital signal obtained after symbol synchronization processing, wherein a value of N is corresponding to a preset length of direct-current statistics collection signal points;

dividing the direct-current amount of the N signal points by the preset length of the direct-current statistics collection signal points to obtain a direct-current component; and subtracting the direct-current component from each signal point to obtain the distorted signal before correction.

10. The device according to claim 1, wherein the program further includes instructions for:

obtaining an optimal transmit end correction coefficient by calculation according to an adaptive iteration algorithm; and obtaining the receive end baseband signal by calculation according to the frequency offset corrected signal, an image of the frequency offset corrected signal, and the optimal transmit end correction coefficient, wherein the receive end baseband signal is a difference between the frequency offset corrected signal and the receive end image component, and wherein the receive end image component is a product of the optimal transmit end correction coefficient and the image of the frequency offset corrected signal.

11. The device according to claim 10, wherein the program further includes instructions for:

obtaining a compensation coefficient increment by using a hard decision process, wherein the compensation coefficient increment is a product of a quantized value of an input signal in hard decision, an iteration step, and a difference that is obtained by calculation, wherein the difference that is obtained by calculation is a difference between a quantized value of an output signal in hard decision and the quantized value of the input signal in hard decision, wherein the input signal has already been aligned with the output signal before the difference is obtained, wherein the iteration step is used to adjust a transmit end correction coefficient, and wherein a compensation coefficient increment obtained at the first time is the first transmit end correction coefficient; and updating the transmit end correction coefficient by accumulating the compensation coefficient increment, until the optimal transmit end correction coefficient is obtained.

12. A method, comprising:
receiving, by a signal receiving apparatus, a radio frequency signal sent by a signal transmitting apparatus, wherein the radio frequency signal is obtained after the signal transmitting apparatus processes a transmit end baseband signal, wherein the radio frequency signal comprises a transmit end image component, and wherein the transmit end image component is generated before the signal transmitting apparatus performs up-conversion processing on an analog signal generated after the signal transmitting apparatus performs digital-to-analog conversion on the transmit end baseband signal, and is an interference signal that is conjugate with the analog signal;
converting the radio frequency signal into a first digital signal;
performing symbol synchronization processing on the first digital signal obtained after analog-to-digital conversion, to obtain a second digital signal, wherein a rate at which the second digital signal runs in the signal receiving apparatus keeps consistent with a rate at which the transmit end baseband signal runs in the signal transmitting apparatus, wherein the second digital signal comprises a receive end image component, and wherein the receive end image component is generated after the signal receiving apparatus performs down-conversion processing on the received radio frequency signal, and is an interference signal that is conjugate with a low frequency signal generated after down-conversion processing is performed on the radio frequency signal;
removing the receive end image component from the second digital signal obtained after symbol synchronization processing, to obtain a quadrature modulation compensated signal;
performing frequency adjustment on the quadrature modulation compensated signal, so that a frequency of a frequency offset corrected signal obtained after adjustment is the same as a frequency of the transmit end baseband signal; and
removing the transmit end image component from the frequency offset corrected signal obtained after adjustment, to obtain a receive end baseband signal.

13. The method according to claim 12, further comprising:
adjusting a modulus value of the first digital signal obtained after analog-to-digital conversion, the second digital signal obtained after symbol synchronization processing, the quadrature modulation compensated signal, the frequency offset corrected signal, or the receive end baseband signal.

14. The method according to claim 13, wherein the modulus value of the first digital signal, the second digital signal, the quadrature modulation compensated signal, the frequency offset corrected signal, or the receive end baseband signal whose modulus value is adjusted keeps consistent with a modulus value of the transmit end baseband signal.

15. The method according to claim 12, further comprising:
performing phase adjustment on the receive end baseband signal, so that the receive end baseband signal whose phase is adjusted keeps consistent with a phase of the transmit end baseband signal.

16. The method according to any one of claim 12, wherein the removing the receive end image component from the second digital signal obtained after symbol synchronization processing, to obtain a quadrature modulation compensated signal comprises:
performing direct-current component removing processing on the second digital signal obtained after symbol synchronization processing, to obtain a distorted signal before correction;
obtaining a receive end correction coefficient by calculation according to the distorted signal before correction that is obtained after direct-current removing, wherein the receive end correction coefficient is a ratio of an autocorrelation value of the distorted signal before correction to a cross-correlation value of the distorted signal before correction and an image of the distorted signal before correction; and
obtaining the quadrature modulation compensated signal by calculation according to the distorted signal before correction, the image of the distorted signal before correction, the receive end correction coefficient, and the image of the distorted signal before correction, wherein the quadrature modulation compensated signal is a difference between the distorted signal before correction and the receive end image component, and wherein the receive end image component is a product of the receive end correction coefficient and the image of the distorted signal before correction.

17. The method according to claim 16, wherein the performing direct-current component removing processing on the second digital signal obtained after symbol synchronization processing, to obtain a distorted signal before correction comprises:
collecting statistics about a direct-current amount of N signal points of the second digital signal obtained after symbol synchronization processing, wherein a value of N is corresponding to a preset length of direct-current statistics collection signal points;
dividing the direct-current amount of the N signal points by the preset length of the direct-current statistics collection signal points to obtain a direct-current component; and
subtracting the direct-current component from each signal point to obtain the distorted signal before correction.

18. The method according to claim 12, wherein the removing the transmit end image component from the frequency offset corrected signal obtained after adjustment, to obtain a receive end baseband signal comprises:
obtaining an optimal transmit end correction coefficient by calculation according to an adaptive iteration algorithm; and
obtaining the receive end baseband signal by calculation according to the frequency offset corrected signal, an image of the frequency offset corrected signal, and the optimal transmit end correction coefficient, wherein the receive end baseband signal is a difference between the frequency offset corrected signal and the receive end image component, and wherein the receive end image component is a product of the optimal transmit end correction coefficient and the image of the frequency offset corrected signal.

19. The method according to claim 18, wherein the obtaining an optimal transmit end correction coefficient by calculation according to an adaptive iteration algorithm comprises:
obtaining a compensation coefficient increment by using a hard decision process, wherein the compensation coefficient increment is a product of a quantized value of an input signal in hard decision, an iteration step, and a difference that is obtained by calculation, wherein the difference that is obtained by calculation is a difference between a quantized value of an output signal in hard decision and the quantized value of the input signal in hard decision, wherein the input signal has already been aligned with the output signal before the difference is obtained, wherein the iteration step is used to adjust a transmit end correction coefficient, and wherein a compensation coefficient increment obtained at the first time is the first transmit end correction coefficient; and updating the transmit end correction coefficient by accumulating the compensation coefficient increment, until the optimal transmit end correction coefficient is obtained.

20. The method according to claim 18, wherein the adaptive iteration algorithm comprises at least one of a least mean square algorithm, a Newton gradient iteration algorithm, or a modified conjugate gradient method for a least square solution.

\* \* \* \* \*